(12) United States Patent
Frazier et al.

(10) Patent No.: US 8,868,886 B2
(45) Date of Patent: Oct. 21, 2014

(54) TASK SWITCH IMMUNIZED PERFORMANCE MONITORING

(75) Inventors: Giles R. Frazier, Austin, TX (US); David S. Levitan, Austin, TX (US); Brian R. Mestan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 13/079,189

(22) Filed: Apr. 4, 2011

(65) Prior Publication Data

US 2012/0254837 A1    Oct. 4, 2012

(51) Int. Cl.
*G06F 11/34* (2006.01)

(52) U.S. Cl.
CPC ........ *G06F 11/348* (2013.01); *G06F 2201/865* (2013.01)
USPC ....................................... 712/220

(58) Field of Classification Search
CPC .............. G06F 11/3636; G06F 21/554; G06F 9/45533; G06F 11/3476; G06F 9/45554; G06F 9/4812; G06F 11/348; G06F 2201/865
See application file for complete search history.

(56) References Cited

U.S. PATENT DOCUMENTS

| | | | |
|---|---|---|---|
| 5,381,533 A | 1/1995 | Peleg et al. | |
| 5,875,324 A | 2/1999 | Tran et al. | |
| 5,970,439 A * | 10/1999 | Levine et al. | 702/186 |
| 6,170,083 B1 | 1/2001 | Adl-Tabatabai | |
| 6,253,338 B1 * | 6/2001 | Smolders | 714/45 |
| 6,351,844 B1 | 2/2002 | Bala | |
| 6,513,133 B1 | 1/2003 | Campbell | |
| 6,539,500 B1 * | 3/2003 | Kahle et al. | 714/45 |
| 6,647,491 B2 | 11/2003 | Hsu et al. | |
| 6,920,549 B1 | 7/2005 | Ukai | |
| 7,000,095 B2 | 2/2006 | Jeppesen et al. | |
| 7,076,640 B2 | 7/2006 | Kadambi | |
| 7,103,877 B1 | 9/2006 | Arnold et al. | |
| 7,243,350 B2 | 7/2007 | Lindwer | |
| 7,315,795 B2 * | 1/2008 | Homma | 702/182 |
| 7,490,229 B2 | 2/2009 | Tremblay et al. | |

(Continued)

OTHER PUBLICATIONS

Rotenberg, et al., "Trace cache: a low latency approach to high bandwidth instruction fetching", Proceedings of the $29^{th}$ Annual IEEE/ACM International Symposium on Microarchitecture, Dec. 2-4, 1996, pp. 24-34, xii+359, IEEE Comput. Soc. Press, Paris, FR.

(Continued)

*Primary Examiner* — Eric Coleman
(74) *Attorney, Agent, or Firm* — Mitch Harris, Atty at Law, LLC; Andrew M. Harris; Matthew W. Baca (57) ABSTRACT

A performance monitoring technique provides task-switch immune operation without requiring storage and retrieval of the performance monitor state when a task switch occurs. When a hypervisor signals that a task is being resumed, it provides an indication, which starts a delay timer. The delay timer is resettable in case a predetermined time period has not elapsed when the next task switch occurs. After the delay timer expires, analysis of the performance monitor measurements is resumed, which prevents an initial state or a state remaining from a previous task from corrupting the performance monitoring results. The performance monitor may be or include an execution trace unit that collects taken branches in a current trace and may use branch prediction success to determine whether to collect a predicted and taken branch instruction in a current trace or to start a new segment when the branch resolves in a non-predicted direction.

24 Claims, 5 Drawing Sheets

(56) References Cited

U.S. PATENT DOCUMENTS

| | | | |
|---|---|---|---|
| 7,496,908 B2* | 2/2009 | DeWitt et al. | 717/158 |
| 7,603,545 B2 | 10/2009 | Sunayama et al. | |
| 7,657,893 B2 | 2/2010 | Armstrong et al. | |
| 7,694,281 B2 | 4/2010 | Wang et al. | |
| 7,765,387 B2 | 7/2010 | Sunayama et al. | |
| 7,949,854 B1 | 5/2011 | Thaik et al. | |
| 8,042,007 B1* | 10/2011 | Chan et al. | 714/45 |
| 8,261,244 B2 | 9/2012 | Pietrek | |
| 8,281,304 B2* | 10/2012 | Kimura | 718/1 |
| 8,407,518 B2* | 3/2013 | Nelson et al. | 714/13 |
| 8,612,730 B2* | 12/2013 | Hall et al. | 712/227 |
| 2002/0066081 A1 | 5/2002 | Duesterwald et al. | |
| 2005/0081107 A1 | 4/2005 | DeWitt et al. | |
| 2005/0132363 A1 | 6/2005 | Tewari et al. | |
| 2005/0210454 A1 | 9/2005 | DeWitt et al. | |
| 2006/0005180 A1 | 1/2006 | Nefian et al. | |
| 2006/0080531 A1 | 4/2006 | Sinha et al. | |
| 2006/0168432 A1 | 7/2006 | Caprioli et al. | |
| 2007/0294592 A1 | 12/2007 | Ashfield et al. | |
| 2008/0086597 A1 | 4/2008 | Davis et al. | |
| 2008/0171598 A1 | 7/2008 | Deng | |
| 2008/0222632 A1* | 9/2008 | Ueno et al. | 718/1 |
| 2009/0037709 A1 | 2/2009 | Ishii | |
| 2009/0254919 A1 | 10/2009 | Jayaraman et al. | |
| 2010/0017791 A1 | 1/2010 | Finkler | |
| 2010/0306764 A1 | 12/2010 | Khanna | |
| 2011/0107071 A1 | 5/2011 | Jacob (Yaakov) | |
| 2012/0005462 A1 | 1/2012 | Hall | |
| 2012/0005463 A1 | 1/2012 | Mestan et al. | |
| 2012/0254670 A1 | 10/2012 | Frazier et al. | |
| 2012/0323806 A1 | 12/2012 | Abrams et al. | |
| 2013/0055033 A1 | 2/2013 | Frazier et al. | |

OTHER PUBLICATIONS

Jacobson, et al., "Trace Preconstruction", Proceedings of 27th International Symposium in Computer Architecture, Jun. 14, 2000, pp. 37-46, ACM vi+328, Vancouver, BC, CA.

Merten, et al., "A hardware-driven profiling scheme for identifying program hot spots to support runtime optimization", Proceedings of the 26th Annual International Symposium on Computer Architecture, May 2-4, 1999, pp. 136-148, IEEE Comp. Soc. Press, Atlanta, GA.

Patel, et al., "Improving trace cache effectiveness with branch promotion and trace packing", Proceedings of the 1998 25th Annual International Symposium on Computer Architecture, Jun. 27-Jul. 1, 1998, pp. 262-271, IEEE Computer Soc. Press, Barcelona, ES.

Yeh, et al., "Increasing the instruction fetch rate via multiple branch prediction and a branch address cache", ICS 1993 Proceedings of the 7th International Conference on Supercomputing, Jul. 1993, pp. 67-76, Tokyo, JP.

Liu, "Predict Instruction Flow Based on Sequential Segments", IBM Technical Disclosure Bulletin, Apr. 1991, pp. 66-69, vol. 33, No. 11.

Shi, et al., "Analyzing the Effects of Trace Cache Configurations on the Prediction of Indirect Branches", Journal of Instruction-Level Parallelism, Feb. 2006, Raleigh, NC.

Zagha, et al.,"Performance Analysis Using the MIPS R10000 Performance Counters", Proceedings of the 1996 ACM/IEEE Conference on Supercomputing, Nov. 1996, Pittsburgh, PA.

Nataraj, et al., "Ghost in the Machine: Observing the effects of Kernel Operation on Parallel Application Performance", International Conference for High Performance Computing, Networking, Storage and Analysis, Nov. 2007, Reno, NV.

Anonymous, "Fast Identification of Previously-retrieved Callstacks", ip.com document IPCOM000200962D, Nov. 2010.

Intel Itanium2 Processor Reference Manual for Software Development and Optimization, May 2004, US.

"Intel 64 and IA-32 Architectures Optimization Reference Manual", Jun. 2011, US.

Bala, et al., "Dynamo: A Transparent Dynamic Optimization System", In Proceedings of Programming Language Design and Implementation (PLOD), 2000, US.

Bond, et al., "Probabilistic Calling Context", In Proceedings of Object Oriented Programming Systems Languages and Applications (OOPSLA) 2007, US.

Odaira, et al., "Efficient Runtime Tracking of Allocation Sites in Java", In Proceedings of Virtual Execution Environments (VEE), 2010, US.

Lu, et al., "Design and Implementation of a Lightweight Dynamic Optimization System", Journal of Instruction Level Parallelism, Apr. 2004, US.

Mars, et al., "MATS: Multicore Adaptive Trace Selection", IEEE/ACM International Symposium on Code Generation and Optimization (CGO), 3rd Workshop on Software Tools for MultiCore Systems, Apr. 6, 2008, 6 pgs., Boston, MA.

Merten, et al., "A Hardware Mechanism for Dynamic Extraction and Relayout of Program Hot Spots", Proceedings of the 27th Annual International Symposium on Computer Architecture, May 2000, pp. 59-70, vol. 28, Issue 2, Vancouver, BC, Canada.

Office Action in U.S. Appl. No. 12/828,697 mailed on Feb. 7, 2013.

U.S. Appl. No. 12/828,697, filed Jul. 1, 2010, Hall, et al.

Shi, et al., "Analyzing the Effects of Trace Cache Configurations on the Prediction of Indirect Branches", Journal of Instruction-Level Parallelism, Feb. 2006, 24 pages (pp. 1-24 in pdf), Raleigh, NC.

Zagha, et al.,"Performance Analysis Using the MIPS R10000 Performance Counters", Proceedings of the 1996 ACM/IEEE Conference on Supercomputing, Nov. 1996, 20 pages (pp. 1-20 in pdf), Pittsburgh, PA.

Nataraj, et al., "The Ghost in the Machine: Observing the Effects of Kernel Operation on Parallel Application Performance", International Conference for High Performance Computing, Networking, Storage and Analysis, Nov. 2007, 12 pages (pp. 1-12 in pdf), Reno, NV.

Anonymous, "Fast Identification of Previously Retrieved Callstacks", ip.com document IPCOM000200962D, Nov. 2010, 3 pages (pp. 1-3 in pdf).

Intel 64 and IA-32 Architectures Software Developers Manual, vol. 3A: System Programming Guide, Part 1, Mar. 2010, 812 pages (pp. 1-812 in pdf), US.

Intel Itanium 2 Processor Reference Manual for Software Development and Optimization, May 2004, 196 pages (pp. 1-196 in pdf), US.

"Intel 64 and IA-32 Architectures Optimization Reference Manual", Jun. 2011, 774 pages (pp. 1-774 in pdf), US.

Bala, et al., "Dynamo: A Transparent Dynamic Optimization System", In Proceedings of Programming Language Design and Implementation (PLOD), 2000, pp. 1-12, US.

Bond, et al., "Probabilistic Calling Context", In Proceedings of Object Oriented Programming Systems Languages and Applications (OOPSLA) 2007, 15 pages( pp. 1-15 in pdf), US.

Odaira, et al., "Efficient Runtime Tracking of Allocation Sites in Java", In Proceedings of Virtual Execution Environments (VEE), 2010, 12 pages (pp. 1-12 in pdf), US.

Lu, et al., "Design and Implementation of a Lightweight Dynamic Optimization System", Journal of Instruction Level Parallelism, Apr. 2004, 24 pages (pp. 1-24 in pdf), US.

Office Action in U.S. Appl. No. 12/828,697 mailed on Feb. 7, 2013, 27 pages (pp. 1-27 in pdf).

* cited by examiner

TASK SWITCH IMMUNIZED PERFORMANCE MONITORING

BACKGROUND

1. Field of the Invention

The present invention is related to computer systems in which performance is measured using hardware measurement circuits, and in particular to techniques for maintaining performance monitoring measurements across program execution cycles.

2. Description of Related Art

In computer systems, performance can be improved by monitoring the performance of the computer system while executing various programs, for example, the number of instructions executed or the total time elapsed while performing a task is a benchmark indication of the efficiency of the computer system at performing the task. By observing characteristics of program execution, in particular, by observing characteristics of "hot spots", i.e., portions of a program that are executed most frequently, the program can be optimized, either off-line or on-the-fly, using the result of the performance measurements.

However, when a task is off-loaded, when the present execution of a program is terminated, to be resumed at a later time and the program is unloaded from memory, the state of the performance monitoring hardware is typically lost, making it difficult to monitor performance of tasks that are executed intermittently. In some cases the performance monitoring state may not be accessible so that the state cannot be stored and retrieved when the task is off-loaded.

A particular performance monitoring technique, as disclosed in U.S. patent application Ser. No. 12/828,697 filed on Jul. 10, 2010 entitled "HARDWARE ASSIST FOR OPTIMIZING CODE DURING PROCESSING", having common inventors with the present U.S. patent application, and which is incorporated herein by reference, identifies execution paths, i.e., sequences of program instructions, in which all of the branch instructions resolve to particular directions, so that the most frequently executed paths, corresponding to the hot spots described above, are given the most effort and resources for program optimization. Rather than collecting the entire state of the branch history for each execution path in order to identify which path is currently being taken by a program, a simplified technique uses branch prediction data to assume a particular execution path is taken if all predictions are correct. Branch prediction state information is also typically not retained, and may not be accessible for storage and retrieval.

BRIEF SUMMARY

The invention is embodied in a method, a computer system, a processor core, and a computer program product, in which performance monitoring information is not retained when a task is off-loaded and when a task is loaded for execution, performance monitoring analysis is postponed until sufficient performance monitoring has been performed to ensure accuracy of the results.

The performance monitoring output or analysis may be delayed for a predetermined time period or instruction cycles, and may be triggered by a computer program such as a hypervisor, indicating that the task has been loaded and the delay should be started. After the delay has expired, the performance monitoring results may be analyzed.

The performance monitoring may be a program execution branch analysis that determines frequently executed execution paths by using successful branch predictions to provide an indication that a particular execution path is being taken and the application of the technique may be postponed until the branch history information for the new task execution session has been updated and the effects of state information retained from a previous session or generated as an initialized state (e.g., reset state) has been attenuated.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION

The present invention encompasses techniques for program performance monitoring in computer systems in which program operation may be interrupted by context and/or task switching. Rather than saving the state of performance monitoring hardware, which may not be possible in some hardware designs, when program execution is resumed, a delay is commenced to postpone analysis of the performance monitoring results until sufficient performance monitoring has been performed for the current execution cycle, in order to ensure accuracy of the results. In a particular embodiment of the present invention, the performance monitoring collects trace segments from branch history information in order to locate program hotspots for optimization, or other reasons for which the trace segment information is desirable. The trace segment information is not gathered until the branch history information has been sufficiently updated for each new execution cycle, preventing information from previous execution cycles of other programs from generating invalid segment analysis results.

Figure 1:
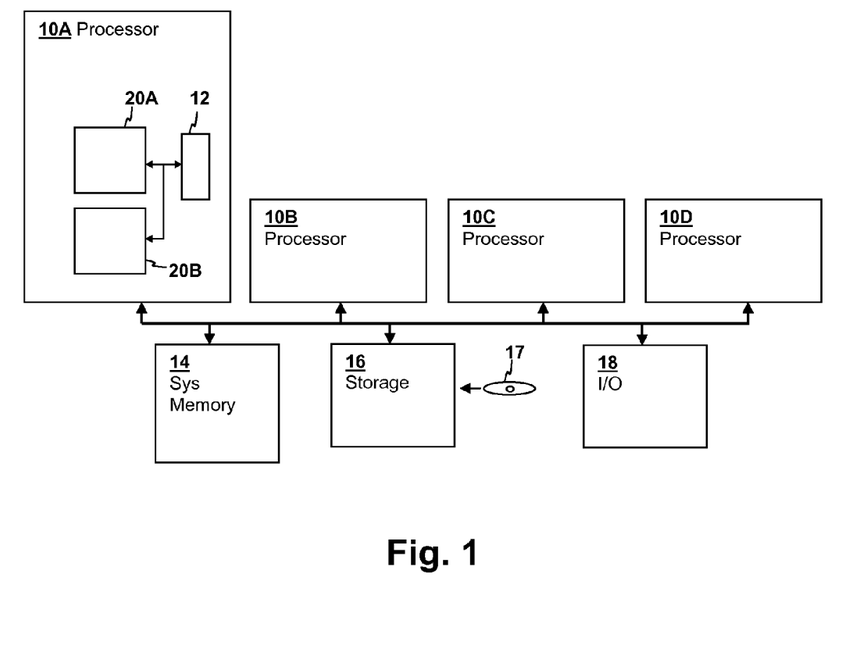
FIG. 1 is a block diagram illustrating a computer system including in which techniques according to an embodiment of the present invention are practiced.

FIG. 1 shows a processing system in accordance with an embodiment of the present invention. The depicted processing system includes a number of simultaneous multi-threading (SMT) processors 10A-10D. The depicted multi-processing system is illustrative, and processing systems in accordance with other embodiments of the present invention will have different configurations. Processors 10A-10D are identical in structure and include cores 20A-20B and local storage 12, which may be a cache level, or a level of internal system memory. Processors 10A-10D are coupled to main system memory 14, a storage subsystem 16, which includes non-removable drives and optical drives, for reading media such as a CD-ROM 17 for loading program code for execution by processors 10A-10D, including program code that reads and analyzes branching information provided by hardware performance monitoring units within processors 10A-10D, as well as operating system or hypervisor code that controls the switching of programs/tasks in accordance with embodiments of the present invention. The illustrated processing system also includes input/output (I/O) interfaces and devices 18 such as mice and keyboards for receiving user input and graphical displays for displaying information. While the system of FIG. 1 is used to provide an illustration of a system in which the performance monitoring methodology of the present invention is implemented, it is understood that techniques of the present invention can be implemented in other architectures. It is also understood that the present invention applies to other processors in accordance with embodiments of the present invention that may be used in a variety of system architectures.

Figure 2:
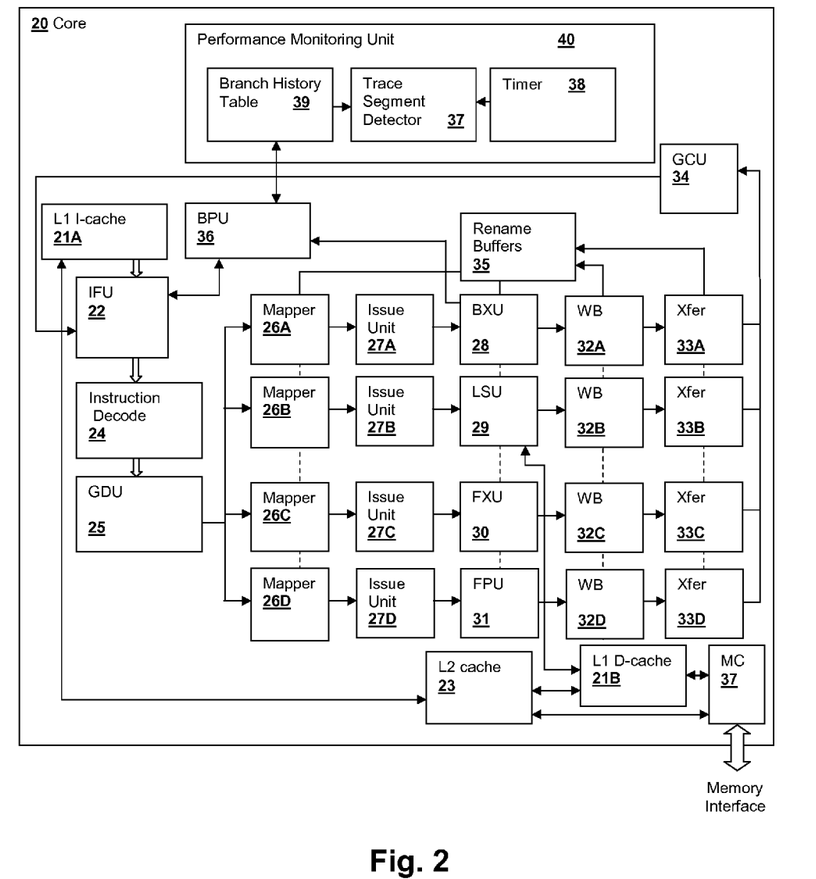
FIG. 2 is a block diagram illustrating details of processor cores 20A-20B in the computer system of FIG. 1.

FIG. 2 illustrates details of a processor core 20 that can be used to implement processor cores 20A-20B of FIG. 1. Core 20 includes an instruction fetch unit (IFU) 22 that fetches instruction streams from L1 I-cache 21A, which, in turn receives instructions from an L2 cache 23. L2 Cache is coupled to a memory controller (MC) 37 that couples processor core 20 to a memory interface. Instructions fetched by IFU 22 are provided to an instruction decode unit 24. A global dispatch unit (GDU) 25 dispatches the decoded instructions to a number of internal processor pipelines. The processor pipelines each include a mapper 26A-26D, an issue unit 27A-27D, an execution unit, one of branch execution unit (BXU) 28, load/store unit (LSU) 29, fixed-point unit (FXU) 30 or floating point unit (FPU) 31, a write back unit (WB) 32A-32D and a transfer unit (Xfer) 33A-33D. A global completion unit (GCU) 34 provides an indication when result transfer is complete to IFU 22. Mappers 26A-26D allocate rename buffers 35 to represent registers or "virtual registers" indicated by instructions decoded by instruction decode unit 24 so that concurrent execution of program code can be supported by the various pipelines. Values in registers located in rename buffers are loaded from and stored to L1 D-cache 21B, which is coupled to L2 cache 23. Core 20 also supports out-of-order execution by using rename buffers 35, as mappers 26A-26D fully virtualize the register values. WBs 32A-32D write pipeline results back to associated rename buffers 35, and Xfers 33A-33D provide an indication that write-back is complete to GCU 34 to synchronize the pipeline results with the execution and instruction fetch process.

In illustrated core 20, a performance monitoring unit 40 gathers information about operation of processor core 20, including performance measurements, which in the illustrative embodiment are trace segment analysis results gathered by a trace segment detector 37. Trace segment detector uses branch prediction and branch prediction accuracy information provided by a branch history table 39, which receives information from a branch prediction unit 36 that may be provided only for performance monitoring, or which may also be used for speculative execution or speculative prefetching by processor core 20.

As execution of a program proceeds, branch prediction unit 36 updates branch history table 39 with a list of branch instructions that have been encountered, an indication of the most likely branch result for each of the branch instructions, and optionally a confidence level of the branch prediction. Trace segment detector 37 uses the information in branch history table 39 to distinguish segments of programs, and to provide useful information such as the number of times a particular segment has been executed. Since, with a few exceptions, branch instructions completely delineate patterns of program flow in which all instructions in a given segment are executed when the segment is entered, it is only necessary to collect the branch information in order to completely describe the segments of a program. In the present invention, a mechanism prevents trace segment detector from constructing segments, i.e., from analyzing the information in branch history table 39 until sufficient information has been updated for the current execution slice and/or program task session.

Figure 3:
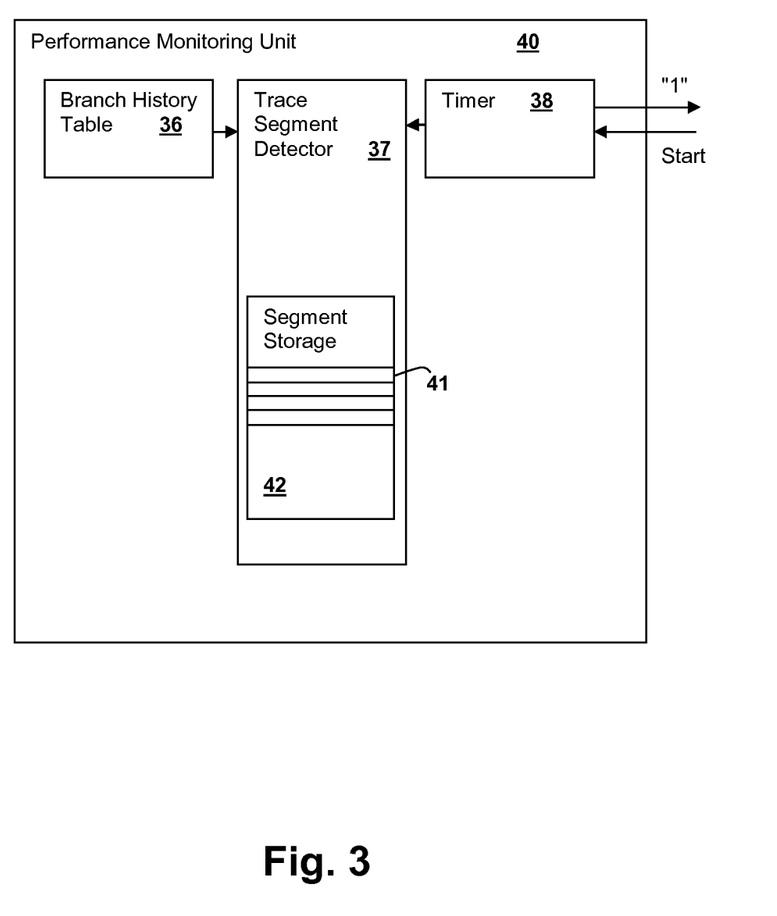
FIG. 3 is a pictorial diagram showing details of performance monitoring unit 40 of FIG. 2 in accordance with an embodiment of the present invention.

Referring now to FIG. 3, details of performance monitoring unit 40 are shown, in accordance with an embodiment of the invention. Branch history table 36 provides branch execution information and branch prediction information to trace segment detector, which builds segment entries 41 in segment storage 42. Segment entries 41 in the depicted embodiments are lists of addresses of branch instructions for which the branch was taken in the corresponding segment and a counter that indicates how many times the segment has been executed. Other or alternative information may be provided within segment entries 41 to provide additional information, or alternative descriptions permitting unique identification of the branch instructions within the segment. For example, segment entries 41 may include the target addresses of branch indirect instructions. Trace segment detector 37 begins building segment entries 41 in response to timer 38 indicating that a predetermined delay time has expired from the last context or task switch that activated the currently executing program. The delay prevents building segment entries 41 from invalid data in branch history table 36 either left from the last program, or left in an incorrect/inaccurate state at startup or other disruptive machine condition. While in the illustrative embodiment a time period timed by delay timer 38 is used, alternative embodiments of the present invention may count instruction cycles, or perform convergence evaluations of branch history table 36, to determine when the branch history information is of sufficient quality to begin analyzing the segments. Further, while the illustrative embodiment is directed toward program trace analysis, the present invention is applicable to other performance monitoring techniques, such as workload measurements, thread or program processor resource usage accounting, and other performance monitor features that may not necessarily be accurately maintained across program context switches, either due to hardware limitations, or storage and I/O overhead limitations.

In the particular embodiment illustrated, timer 38 is started and re-started each time a "1" is written to a control register (or a bit in a control register, which is understood to be a one-bit control register). By providing a readback of a "1" at the control register that is independent of the true state of timer 38, the starting of timer 38 by a hypervisor (or other operating system or meta-operating system) that controls the task or context switching is automatically arranged, as long as the control register is part of the machine state saved at the context switch. Since, when the task is re-started, a value of "1" will always be written back to the control register, timer 38 will be started each time the context is switched. If the context is switched before timer 38 has expired, timer 38 will be restarted, which provides that performance monitoring data will only be analyzed for execution intervals that are of sufficiently duration. The timer can be a programmable value, or as mentioned above, the delay may be based on another count, for example, a count of the number of times a particular instruction is executed, where the address of the particular instruction may be specified by a register that has been previously written by a program, or the timer count may be incremented/decremented each time a branch instruction (or other type of instruction) is executed.

Figure 4:
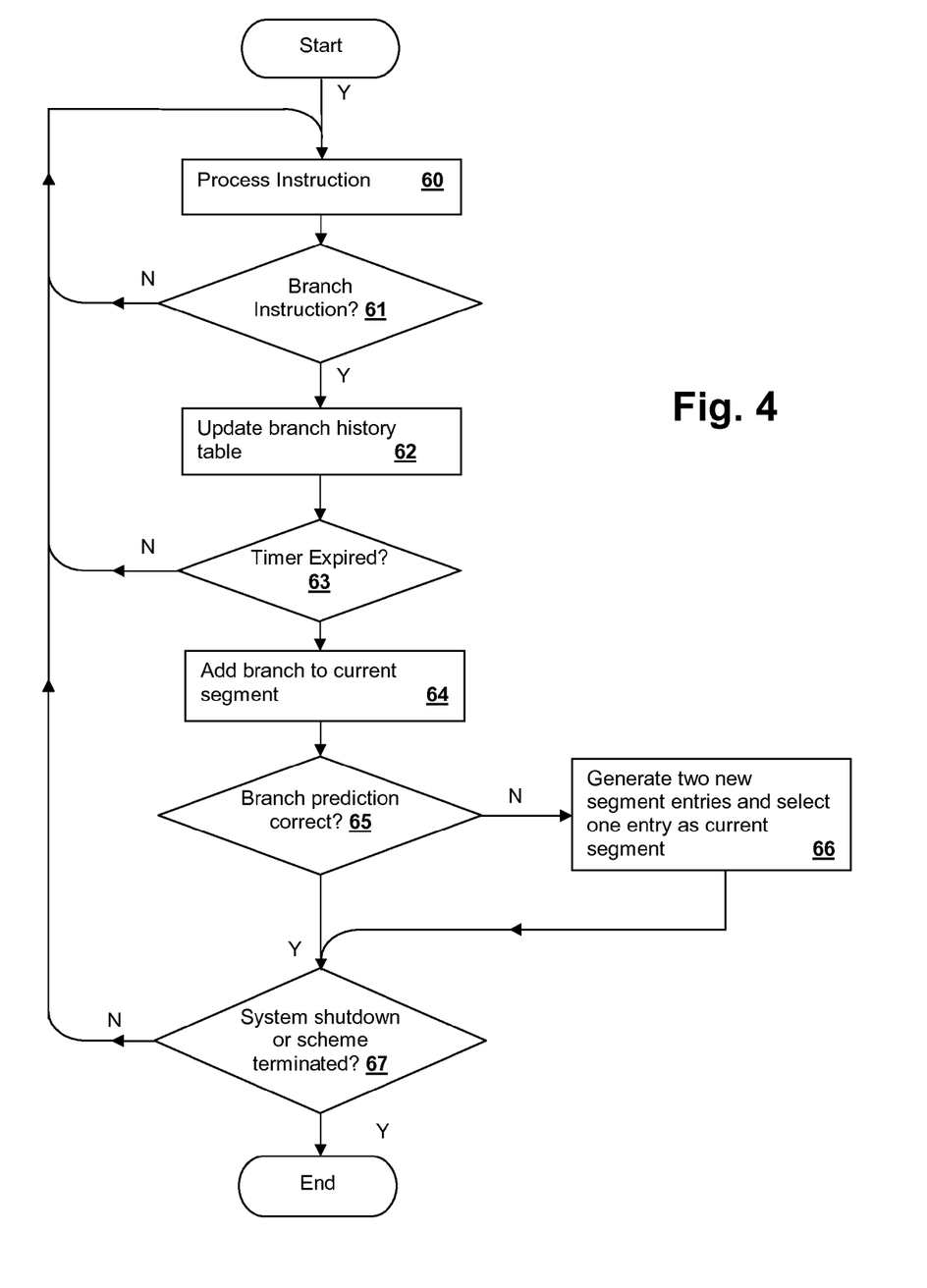
FIG. 4 is a flowchart of a method of performance monitoring within a processor core in accordance with an embodiment of the present invention.

Referring now to FIG. 4, a method of performance monitoring in accordance with an embodiment of the present invention is illustrated in a flowchart. Instructions are processed (executed) by processor core 20 on a continuous basis (step 60). If an instruction is a branch instruction (decision 61) the branch history table is updated with branching information, such as the location (relative addresses) of the branch instructions, along with the corresponding branch prediction state and branch prediction confidence (step 62). Until the delay timer has expired (decision 63), steps 60-62 are repeated without generating segment trace information. Also, if a programmable root instruction register is provided to trigger the segment tracing, then steps 61-62 are not performed until the root instruction is reached, then segment formation begins, but only after the delay timer has expired. Once delay timer has expired (decision 63), when a branch instruction is encountered (decision 61), the branch instruction is added to a current segment (step 64) and if the branch prediction was correct (decision 65), steps 60-65 are repeated until the system is shut down or the scheme is terminated (step 67), with the timer determination in decision 63 being subject to task/context switches that restart the timer. If the branch prediction was incorrect (decision 65), then two new segment entries are generated and one of the entries is selected as the current segment (step 66).

Figure 5:
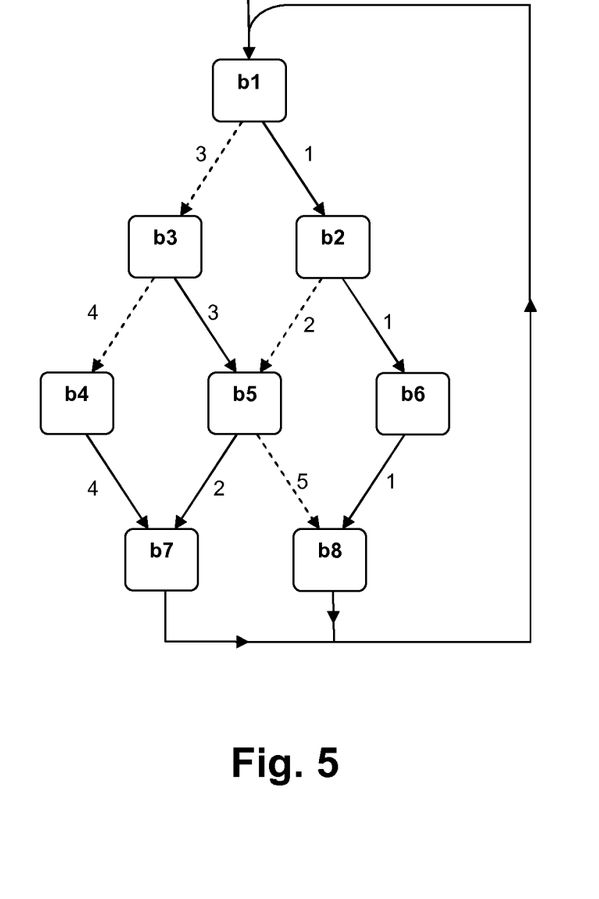
FIG. 5 is an execution diagram showing exemplary branching patterns within a computer system having processor cores in accordance with an embodiment of the present invention.

Referring now to FIG. 5, the segment construction of the illustrative embodiment of the present invention is illustrated. Solid lines show predicted branches, and dashed lines show the other (non-predicted) branch directions. From branch instruction b1, which will be added to the current segment, on the early passes, the predicted branch is taken and belongs to segment 1, as do branch instructions b2, b6 and b8. The entry for segment 1 contains indications of branch instructions b1, b2, b6 and b8, and segment one contains all of the instructions from branch instruction b1 through the loop back to branch instruction b1 from branch instruction b8. The entry for segment 2 is generated the first time branch instruction b2 resolves in the non-predicted direction. Branch instruction b5 is added to segment 2, as is branch instruction b7 once those instructions are encountered. Similarly, the entry for segment 3 is generated when branch instruction b1 is observed taking the non-predicted direction. Branch instruction b3 is added to segment 3, as is branch instruction b5. However, if branch instruction b5 resolves to the non-predicted direction during execution of segment 3, branch instruction b8 will be added to a new segment 5. Similarly if branch instruction b3 resolves to the non-predicted direction, then branch instruction b4 is added to a new segment 4.

The result of the above processing is a collection of segments in which only one instance of a branch instruction indication appears for each branch instruction reached, and that does not grow unless branch instructions are observed taking non-predicted directions. Further, a count is generally maintained that is incremented at each entry to a segment. Since branch prediction information is continually updated, if execution centers around one particular execution path, the count for that execution path will be much greater than the others, and can be targeted for optimization. The present invention ensures that stale branch prediction data is not used in forming the segments by using delay or other postponement of the segment formation. If the segment formation was not postponed, the segments formed in the method illustrated in FIG. 5 could be inaccurate and not represent the actual characteristics of the branch instructions, since the data guiding the segment formation was developed during execution of another program. The postponement ensures that the data guiding segment formation has been collected during execution of the current program.

As noted above, portions of the present invention may be embodied in a computer program product, which may include firmware, an image in system memory or another memory/cache, or stored on a fixed or re-writable media such as an optical disc having computer-readable code stored thereon. Any combination of one or more computer readable medium(s) may store a program in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of making performance measurements of a program executing within a computer system, the method comprising:

measuring performance of the program using a dedicated hardware performance monitor unit;

receiving an indication that execution of the program is being suspended from a process that controls task or context switching;

receiving an indication that execution of the program is being resumed from the process that controls task or context switching;

responsive to receiving the indication that the execution of the program is being resumed, and while the measuring is being performed, postponing analysis of results of the measuring within the hardware performance monitor unit until sufficient performance monitoring has been performed by the measuring subsequent to the execution of the program being resumed; and responsive to receiving the indication that the execution of the program is being resumed and while the measuring is being performed, analyzing the results of the measuring within the hardware performance monitor unit to update an analysis result.

2. The method of claim 1, wherein the postponing is performed by:

responsive to the receiving the indication that the execution of the program is being resumed, starting a delay timer that provides an indication that a predetermined time has elapsed; and responsive to receiving the indication that the predetermined time has elapsed from the delay timer, resuming analysis of the results of the measuring within the hardware performance monitor unit.

3. The method of claim 2, wherein the starting a delay timer is restartable, whereby if the predetermined time has not elapsed, responsive to receiving a second indication that execution of the program is being suspended is received, the delay time is restarted to provide the indication that the predetermined time period has elapsed from a time of the receiving the second indication.

4. The method of claim 3, further comprising:

reading a value of a control register that controls the start of the delay timer, wherein a predetermined value is always returned in response to the reading;

storing a result of the reading in a storage;

retrieving the result of the reading; and writing the result of the reading to the control register when the execution of the program is being resumed, wherein the receiving the indication that the execution of the program is being resumed receives a result of the writing, whereby the writing always causes a start or restart of the delay timer.

5. The method of claim 2, further comprising transmitting the indication that the execution of the program is being resumed from a hypervisor executing within the computer system, and wherein the receiving the indication that the execution of the program is being resumed receives the indication that the execution of the program is being resumed from the hypervisor.

6. The method of claim 1, wherein the analyzing traces an execution path of the program by adding branch instructions encountered during the execution of the program to a current trace.

7. The method of claim 6, wherein the analyzing determines whether a branch took a direction predicted for the branch by a hardware branch prediction unit, wherein the analyzing adds the branch to the current trace if the predicted direction was taken, and wherein the analyzing adds the branch to a new trace segment if the predicted direction was not taken.

8. A computer system comprising:

at least one processor core; and at least one memory coupled to the processor core for storing program instructions for execution by the processor, wherein the program instructions form a program executing within the computer system;

a performance monitoring unit for monitoring performance of the program; and a control circuit that receives an indication that execution of the program is being suspended from a process that controls task or context switching, receives an indication that execution of the program is being resumed from the process that controls task or context switching, and responsive to receiving the indication that the execution of the program is being resumed, postpones analysis within of the performance monitoring unit until sufficient performance monitoring has been performed subsequent to the execution of the program being resumed.

9. The computer system of claim 8, wherein the control circuit further comprises a delay timer that provides an indication that a predetermined time period has elapsed, and wherein the control circuit, responsive to the receiving the indication that the execution of the program is being resumed, starts the delay timer, and responsive to receiving the indication that the predetermined time has elapsed from the delay timer, resumes analysis within the performance monitoring unit.

10. The computer system of claim 9, wherein the delay timer is restartable, and wherein the control circuit, responsive to receiving a second indication that execution of the program is being suspended, restarts the delay timer to provide the indication that the predetermined time period has elapsed from a time of the receiving the second indication.

11. The computer system of claim 10, wherein the processor core has a control register that controls the start of the delay timer, wherein a predetermined value is always returned in response to reading of the control register, whereby restoring a state of the control register when the execution of the program is being resumed always causes a start or restart of the delay timer.

12. The computer system of claim 9, wherein the indication that the execution of the program is being resumed is transmitted from a hypervisor executing within the computer system.

13. The computer system of claim 8, wherein the performance monitoring unit traces an execution path of the program by adding branch instructions encountered during the execution of the program to a current trace.

14. The computer system of claim 13, further comprising a branch prediction unit, and wherein the performance monitoring unit determines whether a branch took a direction predicted by the branch prediction unit, wherein the performance monitoring unit adds the branch to the current trace if the predicted direction was taken, and adds the branch to a new trace segment if the predicted direction was not taken.

15. A processor core for executing a program, the processor core comprising:

a performance monitoring unit for monitoring performance of the program; and a control circuit that receives an indication that execution of the program is being suspended from a process that controls task or context switching, receives an indication that execution of the program is being resumed from the process that controls task or context switching, and responsive to receiving the indication that the execution of the program is being resumed, postpones analysis within the performance monitoring unit until sufficient performance monitoring has been performed subsequent to the execution of the program being resumed.

16. The processor core of claim 15, wherein the control circuit further comprises a delay timer that provides an indication that a predetermined time period has elapsed, and wherein the control circuit, responsive to the receiving the indication that the execution of the program is being resumed, starts the delay timer, and responsive to receiving the indication that the predetermined time has elapsed from the delay timer, resumes analysis within the performance monitoring unit.

17. The processor core of claim 16, wherein the delay timer is resettable, and wherein the control circuit, responsive to receiving a second indication that execution of the program is being suspended, restarts the delay timer to provide the indication that the predetermined time period has elapsed from a time of the receiving the second indication.

18. The processor core of claim 17, further comprising a control register that controls the start of the delay timer, wherein a predetermined value is always returned in response to reading of the control register, whereby restoring a state of the control register when the execution of the program is being resumed always causes a start or restart of the delay timer.

19. The processor core of claim 16, wherein the indication that the execution of the program is being resumed is transmitted from a hypervisor executing within the computer system.

20. The processor core of claim 15, wherein the performance monitoring unit traces an execution path of the program by adding branch instructions encountered during the execution of the program to a current trace.

21. The processor core of claim 20, further comprising a branch prediction unit, and wherein the performance monitoring unit determines whether a branch took a direction predicted by the branch prediction unit, wherein the performance monitoring unit adds the branch to the current trace if the predicted direction was taken, and adds the branch to a new trace segment if the predicted direction was not taken.

22. A computer program product comprising a computer readable memory storing program instructions for execution by a processor within a computer system, wherein the program instructions comprise program instructions for managing the execution of multiple programs in the computer system by a process that controls task or context switching, the program instructions comprising program instructions for:

retrieving measurements of performance of the program using a dedicated hardware performance monitor unit within the processor;

suspending execution of a given one of the multiple programs from the process that controls task or context switching;

resuming execution of the given program from the process that controls task or context switching;

providing an indication to the dedicated hardware performance monitor unit within the processor that the execution of the program is being resumed, whereby the hardware performance monitor unit postpones analysis until sufficient performance monitoring has been performed subsequent to the execution of the program being resumed.

23. The computer program product of claim 22, wherein the program instructions for providing the indication to the dedicated hardware performance monitoring unit are repeated each time the execution of the given program is suspended and resumed, whereby the hardware performance monitor unit extends the time that the analysis is postponed each time the indication is provided to the dedicated hardware performance monitoring unit.

24. The computer program product of claim 23, wherein the program instructions for providing the indication to the dedicated hardware performance monitoring unit are program instructions that restore a saved state of a control register that controls a delay timer within the dedicated hardware performance monitoring unit that causes the performance monitor unit to postpone analysis until a predetermined time period timed by the delay timer has elapsed.

* * * * *